(12) United States Patent
Zhu et al.

(10) Patent No.: US 10,536,063 B2
(45) Date of Patent: Jan. 14, 2020

(54) VIBRATION MOTOR AND PORTABLE DEVICE

(71) Applicant: Goertek Inc., Shandong (CN)

(72) Inventors: Yueguang Zhu, Shandong (CN); Chao Wang, Shandong (CN)

(73) Assignee: Goertek, Inc., Weifang City ( * ) Notice: Subject to any disclaimer, the term of this patent is extended or adjusted under 35 U.S.C. 154(b) by 0 days.

(21) Appl. No.: 16/145,133

(22) Filed: Sep. 27, 2018

(65) Prior Publication Data
US 2019/0044426 A1    Feb. 7, 2019

Related U.S. Application Data

(63) Continuation of application No. PCT/CN2016/082845, filed on May 20, 2016.

(30) Foreign Application Priority Data

Mar. 28, 2016    (CN) .......................... 2016 1 0187288

(51) Int. Cl.
*H02K 33/02*    (2006.01)
*G04C 3/10*    (2006.01)
(Continued)

(52) U.S. Cl.
CPC ............. *H02K 33/02* (2013.01); *G04C 3/102* (2013.01); *G04C 3/107* (2013.01); *H02K 5/04* (2013.01);
(Continued)

(58) Field of Classification Search
CPC ........ G04C 3/102; G04C 3/107; H02K 33/00; H02K 33/02; H02K 33/16; H02K 5/04; H02K 5/24
(Continued)

(56) References Cited

U.S. PATENT DOCUMENTS 8,860,263 B2 *    10/2014    Yoon ...................... H02K 33/16
                                                    310/25
2011/0198948 A1 *    8/2011    Keisuke .................. B06B 1/045
                                                    310/25
(Continued)

FOREIGN PATENT DOCUMENTS

CN    101404437 A    4/2009
CN    102163904 A    8/2011
(Continued)

OTHER PUBLICATIONS

International Search Report and Written Opinion, PCT/CN2016/082845, dated Jan. 3, 2017 (19 pages).
(Continued)

*Primary Examiner* — Mang Tin Bik Lian
*Assistant Examiner* — Rashad H Johnson
(74) *Attorney, Agent, or Firm* — Patent Law Works LLP

(57) ABSTRACT

The present invention discloses a vibration motor and a portable device. The motor comprises: a housing, comprising an upper cover and a lower housing connected to each other, an FPCB being inserted in the lower housing, a cavity being arranged inside the housing, and a coil and a vibration system being accommodated in the cavity, wherein the vibration system comprises a vibrator and an elastic support, a magnetic gap is arranged in the vibrator, a first end of the elastic support is connected to the vibrator, and a second end of the elastic support is connected to the housing; and a first end of the coil is fixed at the lower housing, a second end of the coil is inserted in the magnetic gap, and the coil is in signal connection with an external circuit through the FPCB.

9 Claims, 3 Drawing Sheets

(51) Int. Cl.
  *H02K 33/00* (2006.01)
  *H02K 5/24* (2006.01)
  *H02K 33/16* (2006.01)
  *H02K 5/04* (2006.01)

(52) U.S. Cl.
  CPC ............... *H02K 5/24* (2013.01); *H02K 33/00* (2013.01); *H02K 33/16* (2013.01)

(58) Field of Classification Search
  USPC ... 310/15, 16, 17, 25, 26, 28, 29, 36, 37, 51
  See application file for complete search history.

(56) References Cited

U.S. PATENT DOCUMENTS

| | | | | |
|---|---|---|---|---|
| 2011/0198949 A1* | 8/2011 | Furuich | .................. | H02K 33/16 310/25 |
| 2013/0002054 A1* | 1/2013 | Jeon | .................. | H02K 33/16 310/25 |
| 2014/0103750 A1* | 4/2014 | Ishihara | .................. | H02K 33/16 310/25 |
| 2014/0232211 A1* | 8/2014 | Katada | .................. | H02K 33/00 310/25 |
| 2014/0252890 A1* | 9/2014 | Lee | .................. | H02K 33/16 310/25 |

FOREIGN PATENT DOCUMENTS

| | | |
|---|---|---|
| CN | 102857063 A | 1/2013 |
| CN | 103855904 A | 6/2014 |
| CN | 104043575 A | 9/2014 |
| CN | 204886626 U | 12/2015 |
| CN | 105281532 A | 1/2016 |
| CN | 205622467 U | 10/2016 |
| JP | 2009166016 A | 7/2009 |
| KR | 20100111368 A | 10/2010 |

OTHER PUBLICATIONS

First Office Action for Application No. CN201610187288.7, pp. 1-7.
Second Office Action for Application No. CN201610187288.7, pp. 1-11.

* cited by examiner

VIBRATION MOTOR AND PORTABLE DEVICE

CROSS-REFERENCE TO RELATED APPLICATIONS

Pursuant to 35 U.S.C. § 365(c), this application is a continuation of International Application No. PCT/CN2016/082845, filed on May 20, 2016, which claims priority to Chinese Patent Application No. 201610187288.7, filed on Mar. 28, 2016, both of which are hereby incorporated by reference in their entireties.

FIELD OF THE INVENTION

The present invention relates to the technical field of vibration devices, and in particular, to a flat linear vibration motor and a portable device to which the vibration motor is applied.

BACKGROUND OF THE INVENTION

Currently, vibration motors are widely applied to portable devices, especially mobile phone devices. A common vibration motor comprises: a housing formed of a lower housing and an upper cover, and a vibrator, an elastic support, a coil, and an FPCB electrically connected to the coil that are arranged in the housing. Generally, the FPCB and the coil are fixed on the lower housing. That is, the FPCB is first laid flat on the lower housing, and the coil is then bonded on the FPCB. The thickness of the FPCB occupies a space in a vibration direction of a linear motor, and as a result, the vibration effect is reduced. In addition, in an existing vibration motor, the elastic support is usually arranged between the upper cover and the vibrator, and such a design also occupies the space in the vibration direction of the linear motor, making it difficult to implement a light, thin, and miniature motor.

SUMMARY OF THE INVENTION

One objective of the present invention is to provide a new technical solution of a vibration motor.

According to a first aspect of the present invention, a vibration motor is provided. The motor comprises:

a housing, comprising an upper cover and a lower housing connected to each other, an FPCB being inserted in the lower housing, a cavity being arranged inside the housing, and a coil and a vibration system being accommodated in the cavity, wherein the vibration system comprises a vibrator and an elastic support, a magnetic gap is arranged in the vibrator, a first end of the elastic support is connected to the vibrator, and a second end of the elastic support is connected to the housing; and a first end of the coil is fixed at the lower housing, a second end of the coil is inserted in the magnetic gap, and the coil is in signal connection with an external circuit through the FPCB.

Preferably, a penetration hole in a thickness direction of the lower housing is arranged therein, and the FPCB is embedded in the penetration hole.

Preferably, the FPCB comprises an inner connecting portion connecting the coil, an outer connecting portion connecting the external circuit, and a bending portion connecting the inner connecting portion and the outer connecting portion, the inner connecting portion or the inner connecting portion and the bending portion is/are embedded in the penetration hole, and the outer connecting portion is arranged on the lower housing outside the cavity.

Preferably, the lower housing is embedded at a portion, opposite the coil and a side wall of the upper cover, of the FPCB to form a U-shaped bending portion.

Preferably, the first end of the coil is fixedly connected the FPCB, and the coil is fixed at the lower housing through the FPCB.

Preferably, the second end of the elastic support is fixedly connected to the lower housing, and the first end of the elastic support is fixedly connected on a side, near the lower housing, of the vibrator.

Preferably, the vibrator comprises a frame, a magnet, and a weight block, the frame comprises a bottom portion, a side wall, and an inner cavity enclosed by the bottom portion and the side wall, the magnet is arranged in the inner cavity, the magnetic gap is arranged between the magnet and the side wall, and the weight block sleeves the outside surface of the side wall.

Preferably, the height of the frame in a vibration direction is greater than the thickness of the weight block, a through hole is arranged in a position, corresponding to the frame, of the upper cover, and an inner diameter size of the through hole is greater than or equal to an outer diameter size of the frame.

Preferably, the second end of the elastic support is fixedly connected to the upper cover, and the first end of the elastic support is fixedly connected on a side, away from the lower housing, of the vibrator.

According to a second aspect of the present invention, a portable device is provided, wherein the vibration motor provided in the present invention is arranged in the portable device.

The inventor of the present invention finds that in the prior art, an FPCB is laid flat on a lower housing. In such a structure, the thickness of the FPCB occupies a space in a vibration direction of a vibration motor, and as a result, the vibration effect of the motor is reduced. Therefore, the technical task to be accomplished or the technical problem to be resolved in the present invention has never been conceived of or anticipated by a person skilled in the art, and therefore the present invention is a new technical solution.

In the vibration motor provided in the present invention, an FPCB is inserted in a lower housing, so that a space in a vibration direction in the vibration motor is saved, a vibration space of a vibrator is greatly increased, and the vibration effect of the vibration motor is improved.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

Figure 1:
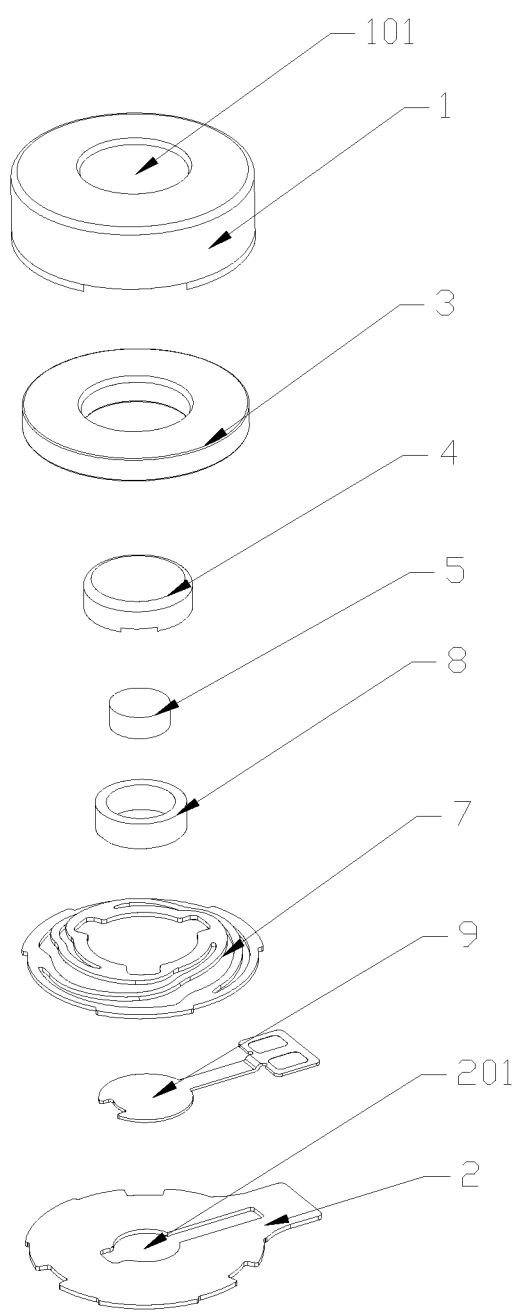
FIG. 1 is an exploded view of a vibration motor according to an embodiment of the present invention.

The reference numerals represent the following parts: 1: Upper cover; 101: Through hole; 102: Cavity; 2: Lower housing; 201: Penetration hole; 202: Through hole; 3: Weight block; 4: Frame; 401: Bottom portion; 402: Side wall; 5: Magnet; 501: Magnetic gap; 6: Washer; 7: Elastic support; 8: Coil; 801: Lead; 9: FPCB; 901: Inner connecting portion; 9011: Inner welding pad; 902: Bending portion; 903: Outer connecting portion; and 9031: Outer welding pad.

DETAILED DESCRIPTION OF THE EMBODIMENTS

Various exemplary embodiments of the present invention will now be described in detail with reference to the accompanying drawings. It should be noted that the relative arrangement, numerical expressions and numerical values of the components and steps arrange forth in these examples do not limit the scope of the present invention unless otherwise specified.

The following description of at least one exemplary embodiment is in fact merely illustrative and is in no way intended as a limitation to the present invention and its application or use.

Techniques, methods, and apparatus known to those of ordinary skill in the relevant art may not be discussed in detail but wherein appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Figure 2:
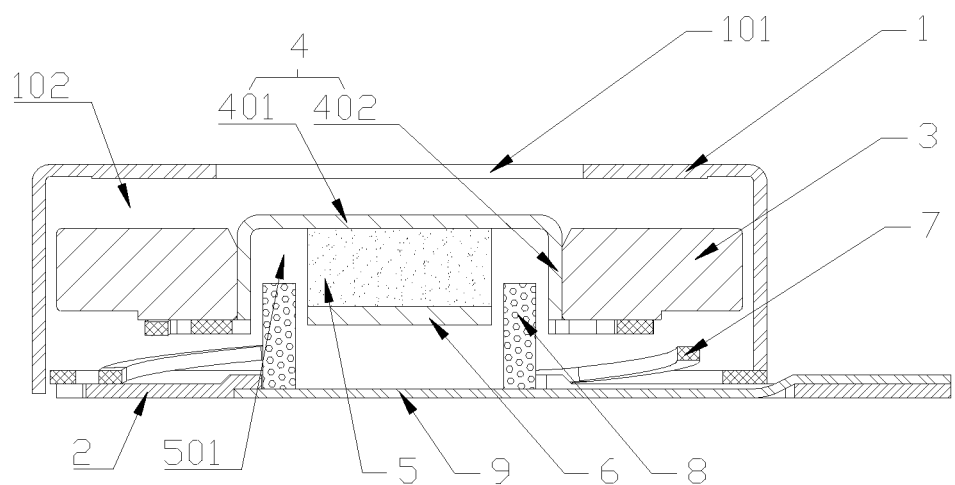
FIG. 2 is a sectional view of a vibration motor according to an embodiment of the present invention.

The present invention provides a vibration motor. As shown in FIGS. 1 and 2, the motor comprises: a housing, a vibration system, and a coil 8. The housing is formed of an upper cover 1 and a lower housing 2 connected to each other in a manner such as buckling, bonding, bolt connection or welding well known to a person skilled in the art. The lower housing has a sheet form. The upper cover has a hollow structure and an open end. The lower housing is arranged at the open end of the upper cover. A cavity 102 is formed inside the housing. The vibration system and the coil 8 are accommodated in the cavity 102. In this embodiment, an FPCB 9 is inserted in the lower housing 2. The FPCB has a sheet form and has a set thickness. In this embodiment, the FPCB is embedded in the surface of the lower housing 2 in the thickness direction.

Figure 3:
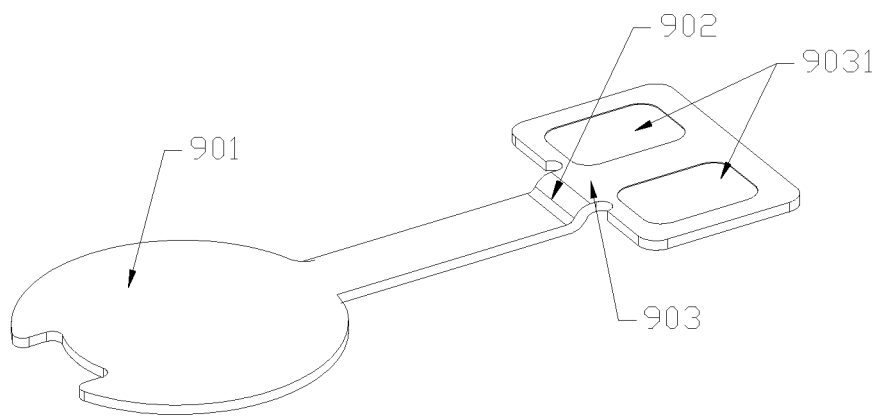
FIG. 3 is a schematic structural view of an FPCB according to an embodiment of the present invention.
Figure 4:
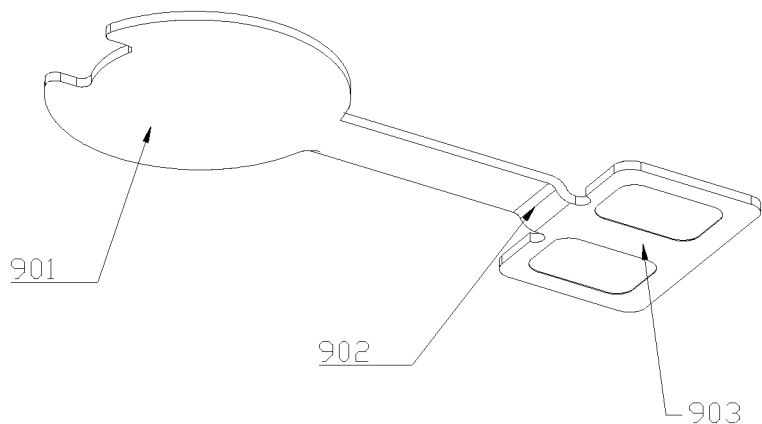
FIG. 4 is a schematic structural view of another FPCB according to an embodiment of the present invention.

As shown in FIGS. 2 to 4, the coil 8 is in signal connection with an external circuit through the FPCB 9. The FPCB 9 comprises an inner connecting portion 901 connecting the coil 8, an outer connecting portion 903 connecting the external circuit, and a bending portion 902 connecting the inner connecting portion 901 and the outer connecting portion 903. The inner connecting portion 901 or the inner connecting portion 901 and the bending portion 902 is/are embedded in a penetration hole 201. The outer connecting portion 903 is arranged on the lower housing 2 outside the cavity. In the inner connecting portion 901 and the outer connecting portion 903, an inner welding pad 9011 in signal connection with the coil 8 is arranged at the inner connecting portion 901. The signal connection between a lead 901 of the coil 8 and the FPCB 9 may be implemented in a manner of tin soldering. Preferably, the inner welding pad 9011 is arranged on a surface, near the coil 8, of the inner connecting portion 901. Such a connection manner facilitates the electrical connection between the lead 801 and the inner welding pad 9011, but does not occupy a vibration space of a vibrator. An outer welding pad 9031 in signal connection with the external circuit is arranged at the outer connecting portion 903. A connection manner between the outer welding pad 9031 and the external circuit may also be tin soldering. It may be understood that two inner welding pads 9011 and two outer welding pads 9031 are separately arranged. The inner welding pads 9011 and the outer welding pads 9031 are electrically connected in a one-to-one correspondence. As shown in FIGS. 3 and 4, to adapt to the electrical connection of the outer connecting portion, the bending portion 902 may have a plurality of bending directions. For example, the bending portion bends upwardly. In this case, the outer connecting portion 903 is arranged on an upper surface of the lower housing 2, and the external circuit may be electrically connected to the outer welding pad 9031 on the upper surface. For example, the bending portion 902 bends downwardly. In this case, the outer connecting portion 903 is arranged on a lower surface of the lower housing 2, and the external circuit may be electrically connected to the outer welding pad 9031 on the lower surface.

Figure 5:
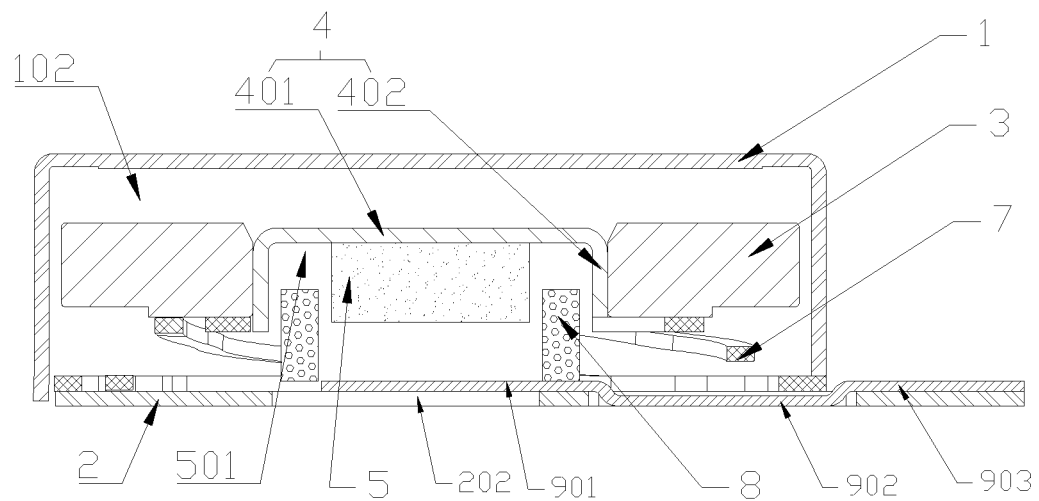
FIG. 5 is a sectional view of another vibration motor according to an embodiment of the present invention.
Figure 6:
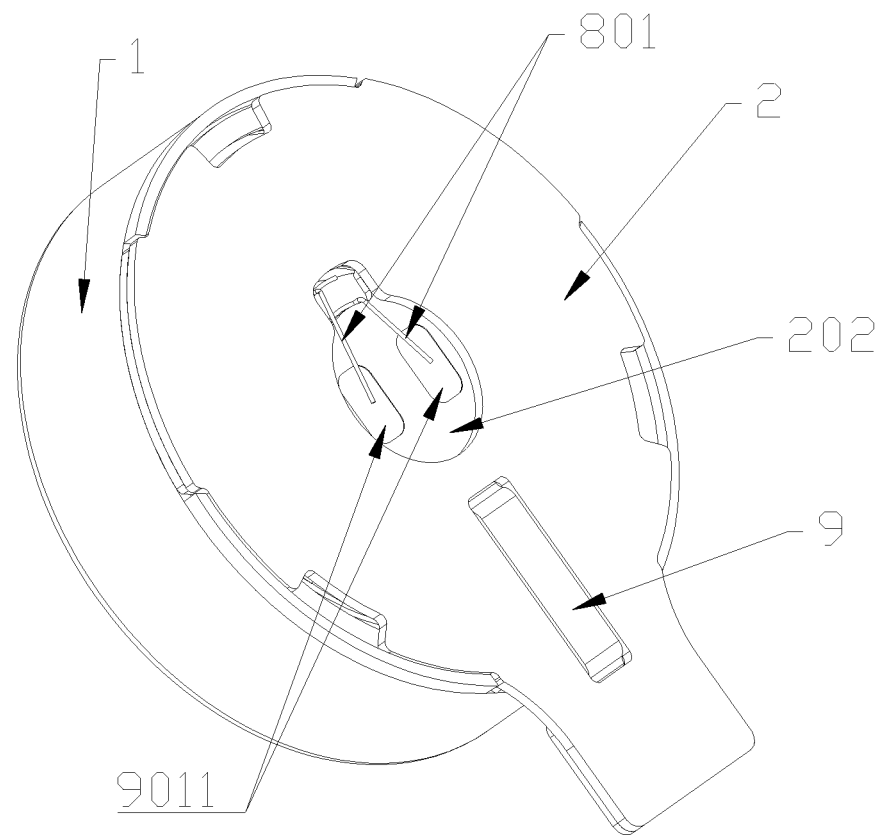
FIG. 6 is a schematic structural view of another vibration motor according to an embodiment of the present invention.

In another specific implementation of the present invention, as shown in FIGS. 5 and 6, the lower housing 2 is embedded at a portion, opposite the coil 8 and a side wall of the upper cover 1, of the FPCB 9 to form a U-shaped bending portion 902. A through hole 202 is further arranged in the lower housing 2. An end of the bending portion 902 is connected to the inner connecting portion 901. The inner welding pad 9011 is arranged on the surface, away from the coil 8, of the inner connecting portion 901. The inner welding pad 9011 is opposite the through hole 202. When the lead 801 is welded, the lead 801 of the coil 8 leaves from a lateral portion of the FPCB 9 to reach the inner welding pad 9011. The through hole 202 provides a space for the electrical connection between the lead 801 and the inner welding pad 9011. In addition, the inner welding pad 9011 is arranged outside the FPCB 9, so that the vibration space of the vibrator is saved, and the vibration motor can easily become miniature, light, and thin. The other end of the bending portion 902 is connected to the outer connecting portion 903. The inner connecting portion 901 and the outer connecting portion 903 are both located on the upper surface of the lower housing 2. The U-shaped structure reserves the vibration space for an elastic support 7 and the vibrator, so that the vibration effect of the vibration motor is improved.

As shown in FIG. 1, the vibration system comprises a magnetic circuit component, a weight block 3, and the elastic support 7 that fit each other. A magnetic gap 501 is arranged in the magnetic circuit component. The weight block 3 and the magnetic circuit component are connected to form the vibrator. The connection may be implemented in a manner such as bonding or clamping. The elastic support 7 may be a spring or an elastic sheet with a spiral cantilever structure. A first end of the elastic support 7 is connected to the vibrator. A second end of the elastic support 7 is connected to the housing. To achieve a more secure connection, a preferred connection form is welding. The coil 8 comprises a first end and a second end arranged opposite each other in an extending direction of the coil 8. The first end of the coil is fixed at the lower housing 2. A person skilled in the art may understand that the first end of the coil 8 may be directly fixedly connected to the lower housing 2, or may be connected to another component first and fixed to the lower housing 2 indirectly through the component. The second end of the coil 8 is inserted in the magnetic gap 501.

The vibrator has a plurality of structural forms. In a specific implementation of the present utility model, as shown in FIGS. 1 and 2, the vibrator comprises a frame 4, a magnet 5, and a weight block 3. The frame 4 comprises a bottom portion 401, a side wall 402, and an inner cavity enclosed by the bottom portion 401 and the side wall 402. The magnet 5 is arranged in the inner cavity. The magnetic gap 501 is arranged between the magnet 5 and the side wall 402. The weight block 3 sleeves the side wall 402. A measure such as bonding well known to a person skilled in the art may be used to fixedly connect the frame 4, the magnet 5, and the weight block 3. The magnet may be, but is not limited to, a ferrite magnet and a neodymium-iron-boron alloy magnet. The frame 4 is a magnetically conductive material such as iron. In the structure, the frame 4 and the magnet 5 form an outer magnetic structure. Certainly, the frame 4 and the magnet may be arranged to be an inner magnetic structure, provided that a stable uniform-intensity magnetic field can be formed.

Furthermore, to make the uniform-intensity magnetic field in the magnetic gap 501 more stable and improve the vibration effect of the vibrator, as shown in FIG. 2, a washer 6 is further arranged on a side, near the lower housing 2, of the magnet 5. The washer 6 has an effect of magnetic conduction and can concentrate magnetic lines into the magnetic gap 501 and make the directions of the magnetic lines be perpendicular to a vibration direction of the vibrator.

In a specific implementation of the present utility model, the height of the frame 4 in a vibration direction is greater than the thickness of the weight block 3. A through hole 101 is arranged in a position, corresponding to the frame 4, of the upper cover 1. An inner diameter size of the through hole 101 is greater than an outer diameter size of the frame 4. During vibration, a protruding part of the frame 4 from the weight block 3 may pass through the through hole 101. The through hole 101 is arranged to increase the height of the vibration space without changing the original size of the housing. Such a structure is more suitable for large-amplitude vibration of the vibrator.

When the vibration motor is working, a vibration signal of the external circuit is transferred to the coil 8 through the circuit layout of the FPCB 9. After being energized, the coil 8 is subject to the effect of a magnetic force in the uniform-intensity magnetic field of the magnetic gap 501. Because the coil 8 is fixed on the lower housing 2, the coil 8 does vibrate. However, the coil 8 applies a counter-acting force to the vibrator, enabling the vibrator to vibrate. Because the direction of the magnetic force on the coil 8 is the direction of cutting the magnetic lines, the vibrator performs linear vibration perpendicular to a plane in which windings of the coil 8 are located.

To increase the inertia to improve the vibration effect, the weight block 3 is further arranged on the vibrator. The material of the weight block 3 may be tungsten steel, stainless steel, or the like. The vibrator is fixedly connected to the elastic support 7. The elastic support 7 inclines to restore the initial position either being compressed or stretched, so as to generate an elastic force. It may be understood that when the elastic support 7 is farther from the initial position, the elastic force is larger. The elastic force then exerts an effect on the vibrator. Therefore, during vibration, the vibrator is subject to the effects of the magnetic force and the elastic force of the elastic support 7. With the presence of the two forces, the vibrator vibrates in a set displacement range.

In the vibration motor provided in the present invention, the FPCB 9 is inserted in the lower housing 2 instead of being laid flat on the surface of the lower housing 2. Such structure saves a space in a vibration direction in the vibration motor, so that a vibration space of the vibrator is greatly increased and the vibration effect of the motor is improved. Moreover, such a structure follows the development advantages that vibration motors become light, thin, and miniature.

In addition, the increased space may be used to increase the thickness of the weight block 3, so that the effect of increasing the vibration of the motor can be achieved.

In a preferred implementation of the present invention, as shown in FIG. 2, to reduce a space occupied by the elastic support 7 in the vibration direction of the vibration motor, the second end of the elastic support 7 is fixedly connected to the lower housing 2, and the first end of the elastic support 7 is fixedly connected on a side, near the lower housing 2, of the vibrator. Specifically, the elastic support 7 is formed of a plurality of cantilevers. The plurality of cantilevers extend from the first end to the second end, and have ends connected to form an annular second end. The contour of the elastic support 7 has a horn shape with a size gradually increasing from the first end to the second end. Preferably, the cantilevers have a gradually expanding spiral form to extend from the first end to the second end. The first end of the elastic support 7 is arranged to be a structure with a hole in the middle. An inner diameter of the hole is greater than an outer diameter of the coil 8. The elastic support 7 may be formed by stamping one sheet material in one step. The magnetic gap 501 is located in an area enclosed by the first end, so that the second end of the coil 8 passes through the hole to enter the magnetic gap 501. The structure of the elastic support 7 is not limited thereto, and another structure such as a Z-shaped structure formed by the cantilevers may further be used, provided that an elastic force can be generated for the vibrator.

During connection, the first end is fixed on a side, near the coil 8, of the vibrator. The second end of the elastic support 7 is fixedly connected on the lower housing 2. It may be understood that the coil 8 and the FPCB 9 may both be arranged in the middle of the area enclosed by the edge of the second end. In such a structure, a space outside the coil 8 is thoroughly used for arranging the elastic support 7 and no additional space is occupied. Therefore, the vibration space is greatly saved, and the vibration motor can have a smaller size.

Certainly, the elastic support 7 may be arranged on a side, away from the coil 8, of the vibrator. In this case, the second end of the elastic support 7 is fixedly connected to the upper cover 1, and the first end of the elastic support 7 is fixedly connected on a side, away from the lower housing 2, of the vibrator. Such a structure facilitates mounting of components.

Furthermore, as shown in FIG. 2, the penetration hole 201 in a thickness direction is arranged in the lower housing 2. The FPCB 9 is embedded in the penetration hole 201. Such a structure can minimize a space occupied by the FPCB 9 in the thickness direction of the FPCB 9. During fabrication, the FPCB 9 only needs to bend once at a position where the FPCB 9 passes through the side wall 402 of the upper cover 1 to enable the inner connecting portion to be embedded in the lower housing 2. An existing FPCB 9 needs to be designed into a U shape in the position of the side wall 402 and bend twice. Therefore, by using such a structure, a processing process of the FPCB 9 is simplified and the yield is improved. The thickness of the lower housing 2 is greater than or equal to the thickness of the FPCB 9. As can be seen, after being embedded, the surface of the FPCB 9 is located below the surface of the lower housing 2. The first end of the coil 8 is fixedly connected to the FPCB 9, and is fixedly connected at the lower housing 2 through the FPCB 9. Such a structure further reduces the space for the coil 8 and the FPCB 9 in the vibration direction.

Certainly, instead of the penetration hole 201, a groove may be arranged in the lower housing 2. The FPCB 9 is arranged in the groove, and a space can similarly be saved. A groove structure further facilitates the fixed connection between the FPCB 9 and the lower housing 2, and the structure of the housing is more stable.

The present invention further provides a portable device, in which the vibration motor provided in the present invention is arranged. The portable device may be a mobile phone, a tablet computer, a notebook computer or the like. The portable device has the characteristic of a good vibration effect.

While certain specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the present invention. The scope of the present invention is subject to the attached claims.

What is claimed is:

1. A vibration motor, comprising:
    a housing, comprising an upper cover and a lower housing connected to each other, an FPCB being inserted in the lower housing, a cavity being arranged inside the housing, and a coil and a vibration system being accommodated in the cavity, wherein
        the vibration system comprises a vibrator and an elastic support, wherein a magnetic gap is arranged in the vibrator, a first end of the elastic support is connected to the vibrator, and a second end of the elastic support is connected to the housing;
        a first end of the coil is fixed at the lower housing;
        a second end of the coil is inserted in the magnetic gap;
        the coil is in signal connection with an external circuit through the FPCB;
        the lower housing is embedded at a portion, opposite the coil and a side wall of the upper cover, of the FPCB to form a U-shaped bending portion;
        a through hole is further arranged in the lower housing; and
        an end of the bending portion is connected to an inner connecting portion; wherein
            the inner connecting portion is located on the upper surface of the lower housing,
            an inner welding pad is arranged on the surface, away from the coil, of the inner connecting portion, and
            the inner welding pad is opposite the through hole.

2. The vibration motor according to claim 1, wherein a penetration hole in a thickness direction of the lower housing is arranged therein, and the FPCB is embedded in the penetration hole.

3. The vibration motor according to claim 2, wherein the FPCB comprises an inner connecting portion connecting the coil, an outer connecting portion connects the external circuit, and a bending portion connects the inner connecting portion and the outer connecting portion, the inner connecting portion or the inner connecting portion and the bending portion is/are embedded in the penetration hole, and the outer connecting portion is arranged on the lower housing outside the cavity.

4. The vibration motor according to claim 1, wherein the first end of the coil is fixedly connected the FPCB, and the coil is fixed at the lower housing through the FPCB.

5. The vibration motor according to claim 1, wherein the second end of the elastic support is fixedly connected to the lower housing, and the first end of the elastic support is fixedly connected on a side, near the lower housing, of the vibrator.

6. The vibration motor according to claim 5, wherein the vibrator comprises a frame, a magnet, and a weight block, the frame comprises a bottom portion, a side wall, and an inner cavity enclosed by the bottom portion and the side wall, the magnet is arranged in the inner cavity, the magnetic gap is arranged between the magnet and the side wall, and the weight block sleeves the outside surface of the side wall.

7. The vibration motor according to claim 6, wherein the height of the frame in a vibration direction is greater than the thickness of the weight block, an upper cover through hole is arranged in a position, corresponding to the frame, of the upper cover, and an inner diameter size of the upper cover through hole is greater than or equal to an outer diameter size of the frame.

8. The vibration motor according to claim 1, wherein the second end of the elastic support is fixedly connected to the upper cover, and the first end of the elastic support is fixedly connected on a side, away from the lower housing, of the vibrator.

9. A portable device, wherein the vibration motor according to claim 1 is arranged in the portable device.

* * * * *